(12) United States Patent  
Yoshida

(10) Patent No.: US 8,937,538 B2  
(45) Date of Patent: Jan. 20, 2015

(54) CHARGING STATE DISPLAYING DEVICE

(71) Applicant: Yazaki Corporation, Tokyo (JP)

(72) Inventor: Kosuke Yoshida, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/071,728

(22) Filed: Nov. 5, 2013

(65) Prior Publication Data

US 2014/0055256 A1    Feb. 27, 2014

Related U.S. Application Data

(63) Continuation of application No. PCT/JP2012/064606, filed on May 31, 2012.

(30) Foreign Application Priority Data

May 31, 2011    (JP) .................................. 2011-122478

(51) Int. Cl.
  *B60Q 1/00*    (2006.01)
  *B60Q 3/00*    (2006.01)
  *H01M 10/48*   (2006.01)

(52) U.S. Cl.
  CPC ............. *B60Q 3/007* (2013.01); *H01M 10/488* (2013.01)
  USPC ..................... 340/455; 340/636.1; 340/815.76

(58) Field of Classification Search
  USPC .............. 340/455, 937, 636.1, 458, 479, 482, 340/488, 478, 5.32, 815.65, 815.75, 815.76
  See application file for complete search history.

(56) References Cited

U.S. PATENT DOCUMENTS

| | | | |
|---|---|---|---|
| 5,757,595 A * | 5/1998 | Ozawa et al. ............... 340/636.1 |
| 2004/0027249 A1* | 2/2004 | Heiser et al. ................ 340/636.1 |
| 2006/0103786 A1* | 5/2006 | Koma et al. .................... 349/107 |
| 2008/0048887 A1* | 2/2008 | Aoki et al. ..................... 340/937 |
| 2011/0007501 A1* | 1/2011 | Kim ............................... 362/184 |
| 2011/0043355 A1 | 2/2011 | Chander et al. |

FOREIGN PATENT DOCUMENTS

| | | |
|---|---|---|
| EP | 0 545 747 A1 | 6/1993 |
| JP | 9-74690 A | 3/1997 |
| JP | 9-285022 A | 10/1997 |
| WO | 2007/024287 A2 | 3/2007 |

OTHER PUBLICATIONS

Search Report dated Sep. 21, 2012 issued in International Application No. PCT/JP2012/064606 (PCT/ISA/210).
Written Opinion dated Sep. 21, 2012 issued in International Application No. PCT/JP2012/064606 (PCT/ISA/237).

* cited by examiner

*Primary Examiner* — Daniel Previl
(74) *Attorney, Agent, or Firm* — Sughrue Mion, PLLC

(57) ABSTRACT

A charging state displaying device includes a casing, a board, a plurality of light sources, and display units. The casing includes a light blocking part. The board is mounted on the light blocking part and is accommodated in the casing. The light sources are disposed on the board so as to be separated by the board. The display units have light-permeability and are provided at positions of the casing corresponding to the light sources respectively. The board is configured to prevent leakage and mixture of lights emitted from the light sources in a cooperation with the light blocking part.

3 Claims, 6 Drawing Sheets

CHARGING STATE DISPLAYING DEVICE

CROSS REFERENCE TO RELATED APPLICATIONS

This application is a continuation of PCT application No. PCT/JP2012/064606, which was filed on May 31, 2012 based on Japanese Patent Application (No. 2011-122478) filed on May 31, 2011, the contents of which are incorporated herein by reference.

BACKGROUND OF THE INVENTION

1. Field of the Invention

The present invention is related to a charging state displaying device equipped with light sources each for notifying a charging state etc. and displaying units.

2. Description of the Related Art

There are known charging state displaying devices which are mounted on vehicles etc. An example of such a kind of charging state displaying device is shown in FIGS. 5A and 5B (see PTL 1).

FIG. 5A is a perspective view showing a schematic configuration of a power feeding part mounted on an electric car according to a related art, and FIG. 5B is a plan view showing the configuration of the power feeding part. The charging state displaying device 100 of this related art is mounted within the power feeding part 710 of the electric car and disposed in adjacent to a charging connector 720. On the one side surface of a casing 200, a display unit 210a for displaying conditioning modes such as heating and cooling of a battery and a display unit 210b for displaying a charging state are disposed in parallel to each other along an elevational direction. Further, a display unit 310 for displaying a remaining capacity of the battery and a remaining charging time needed until the battery is fully charged is provided at the upper portion on the one side surface.

Further, there are known charging state displaying devices for charging dry-cell batteries etc. An example of such a kind of charging state displaying device according to a related art is shown in FIGS. 6A and 6B (see PTL 2).

FIG. 6A is a perspective view showing the charging state displaying device and FIG. 6B is a sectional view cut along a ling VI(B)-VI(B) in FIG. 6A. The charging state displaying device 100S of this related art includes a casing 200S, a board 300S accommodated within the casing 200S and a plurality of light sources 400S such as LEDs mounted on the board 300S. A first light source 400Sa and a second light source 400Sb are disposed in parallel to each other at the upper portion of the board 300S. A first display unit 201Sa and a second display unit 201Sb are provided on the one side surface of the casing 200S in correspondence to the first and second light sources, respectively. Each of the display units 201Sa, 201Sb of this related art acts as a light conduction part of a cylindrical shape. Light blocking parts 240S each formed as a cylindrical rib are provided at the first light source 400Sa and the second light source 400Sb so as to surround the first light source 400Sa and the second light source 400Sb, respectively. Crosstalk due to a leakage of lights from the first light source 400Sa and the second light source 400Sb can be prevented by the light blocking parts 240S.

Citation List

[Patent Literature]
[PTL 1] JP-A-9-285022
[PTL 2] JP-A-9-74690

SUMMARY OF THE INVENTION

According to the charging state displaying device 100 of the related art, although it is disclosed that the charging state displaying device is mounted within the power feeding part 710 of the electric car, there is no disclosure as to the specific configuration other than the display units 210a, 210b.

According to the charging state displaying device 100S of the other related art, it is disclosed that the crosstalk due to the leakage of the lights from the first light source 400Sa and the second light source 400Sb can be prevented by using the light blocking parts 240S. However, since it is necessary to provide the light blocking part 240S for each of the first light source 400Sa and the second light source 400Sb in order to prevent the leakage of the lights from the light sources 400Sa, 400Sb, there arise a problem that the configuration of the device is complicated and the cost thereof increases.

It is therefore one advantageous aspect of the present invention to provide a charging state displaying device which can prevent false recognition due to the leakage of lights from light sources by utilizing a board mounting the light sources thereon and a casing to which the board is attached.

According to one advantage of the invention, there is provided a charging state displaying device comprising:
a casing including a light blocking part;
a board mounted on the light blocking part and accommodated in the casing;
a plurality of light sources disposed on the board so as to be separated by the board; and
display units, having light-permeability, and provided at positions of the casing corresponding to the light sources respectively,
wherein the board is configured to prevent leakage and mixture of lights emitted from the light sources in a cooperation with the light blocking part.

The light sources may be respectively disposed on both opposite faces of the board.

The light blocking part may be a groove provided on an inner surface of the casing.

Two of the display units may be lenses which are respectively provided at different surfaces of the casing.

According to the invention, the light emitted from the light source can be surely transmitted through the display unit and recognized visually. Further, according to the simple configuration of the board and the light blocking part, even when the light source not corresponding to the one display unit is turned on, since the light emitted from this light source does not leak, the false recognition can be prevented. Furthermore, even when the light sources having different luminescent colors are disposed, the mixture of the lights emitted therefrom can be prevented.

Further, the light shielding property of the respective light sources can be improved and the utility value of the board can be enhanced.

The board can be surely accommodated and fixed within the casing and the visibility of the lights emitted from the light sources can be improved.

The board can be surely accommodated and fixed within the casing and the visibility of the lights emitted from the light sources can be improved.

According to the invention, the charging state displaying device can be provided which can surely place the board within the casing, prevent the leakage of the lights from the respective light sources by utilizing the board and the light blocking part placing the board thereon to thereby prevent the mixture of the luminescent colors of the lights and the false recognition, and arrange the display units freely.

BRIEF DESCRIPTION OF THE DRAWINGS

FIG. 4A is a side view showing an external appearance of an electric car, and FIG. 4B is a perspective view showing a power feeding part mounted on the electric car shown in FIG. 4A.

FIG. 5A is a perspective view showing the schematic configuration of a power feeding part mounted on an electric car, and FIG. 5B is a plan view showing the configuration of the power feeding part.

FIG. 6A is a perspective view showing the charging state displaying device, and FIG. 6B is a sectional view cut along a ling VI(B)-VI(B) in FIG. 6A.

DETAILED DESCRIPTION OF THE EXEMPLARY EMBODIMENTS

Hereinafter, embodiments of the charging state displaying device according to the invention will be explained in detail with reference to drawings.

Figure 1:
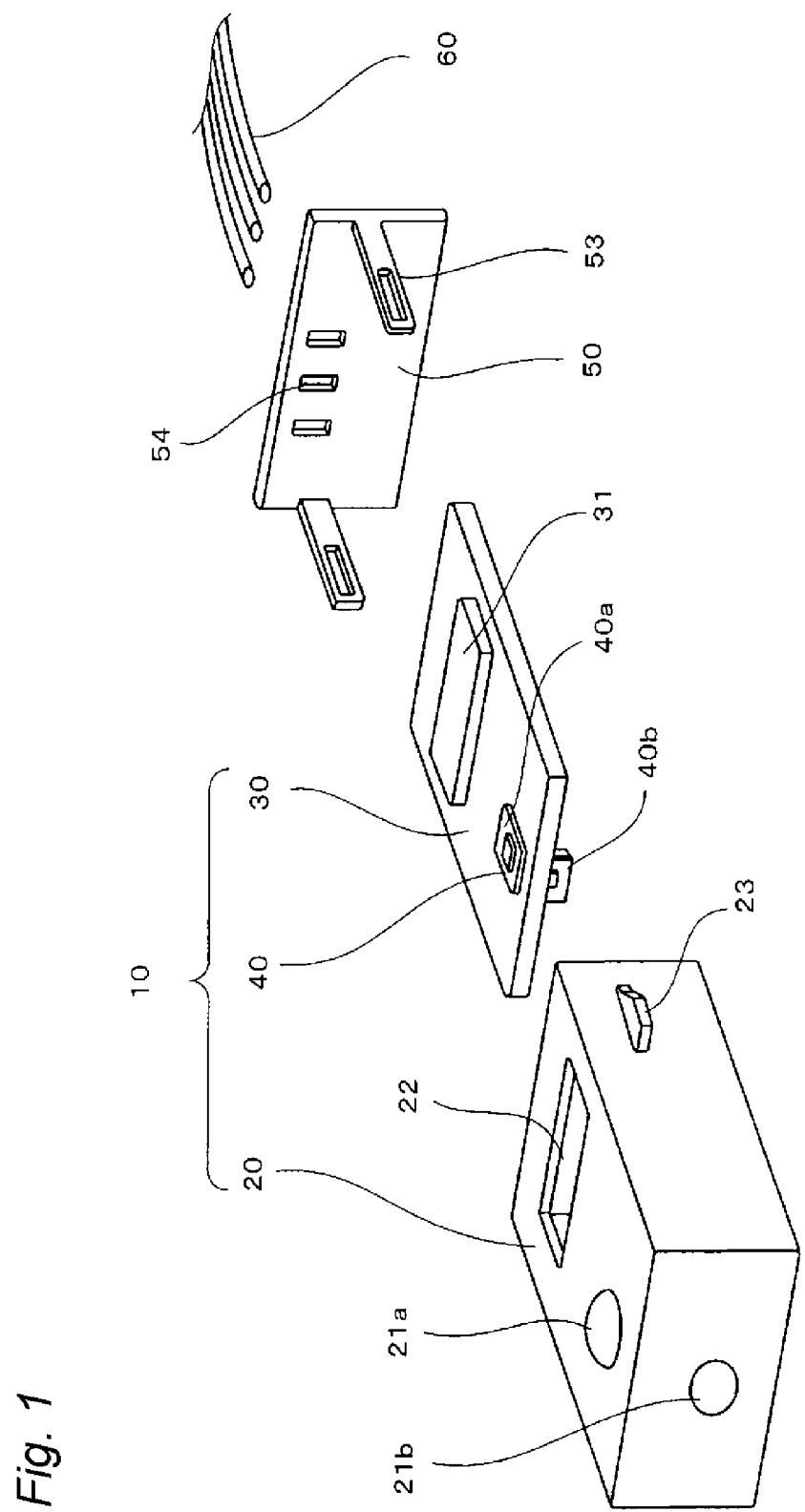
FIG. 1 is an exploded perspective view showing a charging state displaying device according to a first embodiment of the present invention.
Figure 2A:
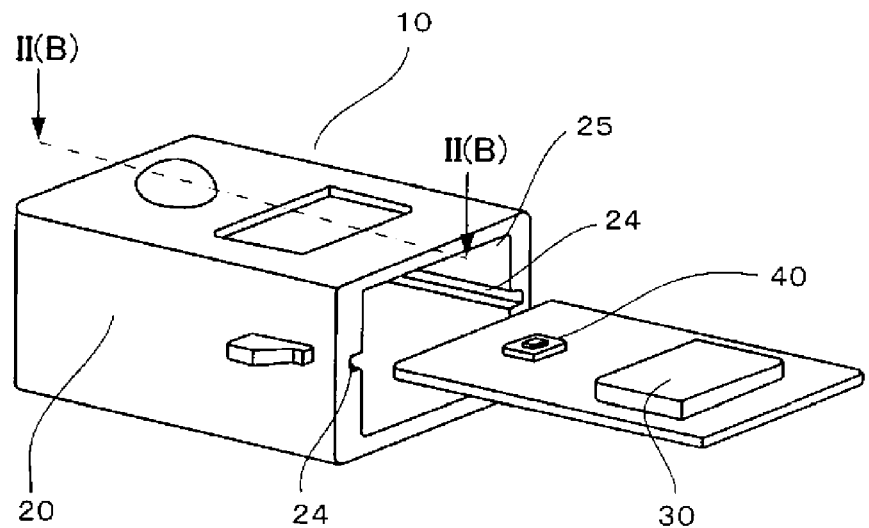
FIG. 2A is a broken perspective view showing a casing and a board of the charging state displaying device of the first embodiment.
Figure 2B:
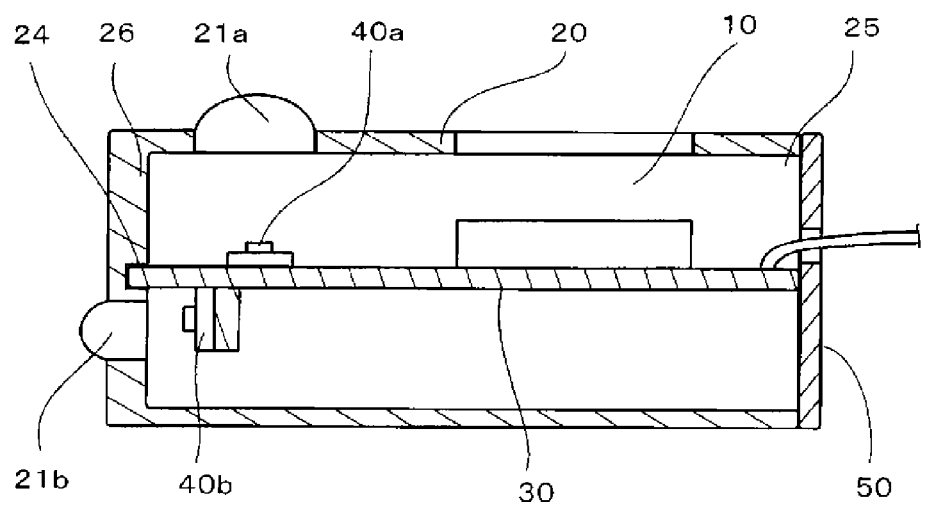
FIG. 2B is a longitudinal sectional view along a line II(B)-II(B) in FIG. 2A in a state that the board is assembled within the casing.

Explanation will be made as to the charging state displaying device 10 according to the first embodiment of the invention. FIG. 1 is an exploded perspective view showing the charging state displaying device 10 according to the first embodiment of the invention. FIGS. 2A and 2B show the charging state displaying device 10 of FIG. 1, wherein FIG. 2A is a broken perspective view showing the casing 20 and the board 30 of the charging state displaying device 10 of the first embodiment, and FIG. 2B is a longitudinal sectional view along a line II(B)-II(B) in FIG. 2A in a state that the board 30 is assembled within the casing 20. The charging state displaying device 10 according to the invention is used for dry-cell batteries, charging devices for household products, feeding devices for electric cars, for example, and is used mainly in order to display the charging state of the battery etc.

The charging state displaying device 10 comprises the casing 20, the board 30 having light blocking effect and accommodated within the casing 20, and a plurality of light sources 40 such as LEDs (Light Emitting Diodes) mounted on the board 30. The casing 20 is provided with display units 21, each having light-permeability for visually recognizing light from the light source 40, at positions corresponding to the light sources 40, respectively. Hereinafter, the explanation will be made in detail according to the embodiment in a manner of replacing the display units 21 by lenses 21. For example, the light source 40 mounted on the upper surface of the board 30 is a first light source 40a, the lens 21 provided on the upper surface of the casing 20 is a first lens 21a. The first light source 40a and the first lens 21a are disposed in a corresponding positional relationship therebetween. That is, the light emitted from the first light source 40a passes through the first lens 21a and is emitted outside, whereby a user can visually recognize a turn-on/turn-off state of the first light source 40a via the first lens 21a.

A second light source 40b is disposed on the lower surface of the board 30. A second lens 21b is provided at the side surface of the casing 20 in correspondence with the radiation direction of light from the second light source 40b. That is, the second light source 40b and the second lens 21b are disposed in a corresponding positional relationship therebetween. In the first embodiment, the first light source 40a and the second light source 40b are disposed separately on the both major surfaces of the board 30, respectively.

The board 30 is provided with a display unit 31 for displaying a charging state such as a remaining charging time needed until the battery etc. is fully charged and an amount of charged capacity. A display window 22 is provided at the casing 20 in correspondence to the position of the display unit. Engagement projections 23 are provided at the both side surfaces of the casing 20. A cover 50 is attached to the casing 20 in a manner that these engagement projections are respectively engaged with engagement pieces 53 formed at the both sides of the cover 50 covering the rear portion of the casing 20. A plurality of insertion ports 54 formed almost at the center portion of the cover 50 act to pass therethrough cords 60 mounted on the board 30.

A light blocking part 24 for shielding lights emitted from the light sources 40 and extending in the inner direction of the casing 20 is formed along the center portion of the casing 20. Hereinafter, the explanation will be made in detail according to the first embodiment in a manner of replacing the light blocking part 24 by a groove 24. The board 30 is accommodated within the casing 20 by being inserted into and placed on the groove 24. The groove 24 is formed so as to be continuous to the inner both side surfaces of the casing 20 and an inner end surface 26 of the casing 20 located in opposite to the opening part 25 thereof. The board 30 is accommodated within the casing 20, and the one end surface and the both side surfaces (three surfaces in total) of the board 30 are mounted on and within the groove 24.

Since the first light source 40a and the second light source 40b are disposed at the both major surfaces of the board 30, the board 30 and the groove 24 act in a cooperation manner to maintain a state that the lights emitted from the first light source 40a and the second light source 40b do not leak to each other. Thus, even in a case that the first light source 40a is turned on and the second light source 40b is turned off, since the light emitted from the first light source 40a does not leak on the second light source 40b side, there never arises false recognition due to the light passing through the second lens 21b. In this manner, since the leakage of the light is prevented by utilizing the existing configuration of the board 30 having the light blocking effect and the groove 24 for supporting the board 30 and shielding the light, the configuration of the device can be simplified and the cost thereof can be reduced.

Figure 3A:
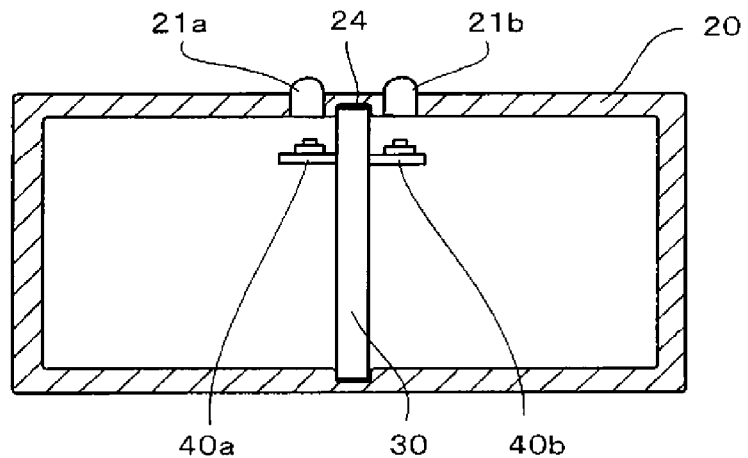
FIG. 3A is a transversal sectional diagram showing a charging state displaying device according to a second embodiment of the invention.
Figure 3B:
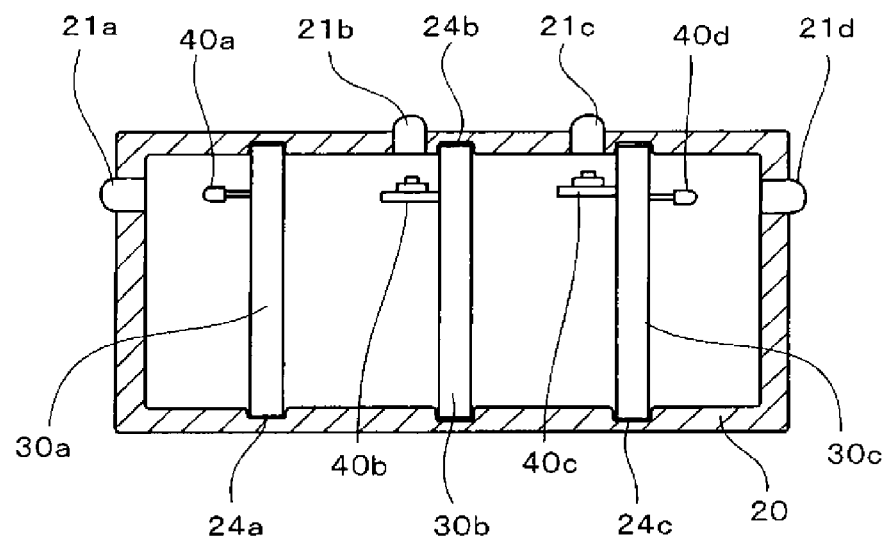
FIG. 3B is a transversal sectional diagram showing a charging state displaying device according to a third embodiment of the invention.

The arrangement of the light sources 40 will be explained in detail with reference to FIGS. 3A and 3B. FIGS. 3A and 3B show the charging state displaying devices 10 according to other embodiments of the invention, wherein FIG. 3A is a transversal sectional diagram showing the charging state displaying device 10 according to the second embodiment and FIG. 3B is a transversal sectional diagram showing the charging state displaying device 10 according to the third embodiment.

In the second embodiment of the invention, the board 30 is attached in the vertical direction with respect to the casing 20. The grooves 24 are formed on the upper surface and the lower surface of the casing 20, respectively. A first light source 40a is disposed on the left side (left side in the figure) of the board 30, and a second light source 40b is disposed on the opposite side of the first light source 40a, that is, the right side (right side in the figure) of the board 30. A first lens 21a corresponding to the first light source 40a and a second lens 21b corresponding to the second light source 40b are provided on the upper surface of the casing 20 in an adjacent manner in the longitudinal direction. Although the lenses 21a, 21b corresponding to the light sources 40a, 40b are provided on the separate side surfaces in the first embodiment, these lenses are concentrically provided on the same surface of the casing 20 in the second embodiment.

In the third embodiment of the invention, a plurality of the boards 30 and a plurality of the light sources 40 are disposed. In the third embodiment, to be concrete, the three boards, that is, a first board 30a, a second board 30b and a third board 30c are disposed in parallel in the longitudinal direction of the casing and are attached to the respective grooves, that is, first grooves 24a, second grooves 24b and third grooves 24c, respectively. In the first board 30a, a first light source 40a is disposed so as to emit light therefrom toward the left side in the casing, and a first lens 21a is provided on the left side surface (left side in the figure) of the casing 20 in correspondence to the first light source. In the second board 30b, a second light source 40b is disposed so as to emit light therefrom toward the upper direction. In the third board 30c, a third light source 40c is disposed on the left side (left side in the figure) of the third board 30c so as to emit light therefrom toward the same direction as that of the light from the second light source 40b. A second lens 21b and a third lens 21c are provided on the upper surface of the casing 20 in correspondence to the second and third light sources, respectively. In the third board 30c, a fourth light source 40d is further disposed on the right side (right side in the figure) of the third board 30c so as to emit light therefrom toward the right side in the casing, and a fourth lens 21d is provided on the right side surface (right side in the figure) of the casing 20 in correspondence to the fourth light source.

According to the aforesaid configuration, since the lights emitted from the plurality of light sources 40 are completely shielded by the single or plural boards 30 and the single or plural grooves 24, there does not arise any light mixture and false recognition due to the leakage of the lights emitted from the respective light sources 40. The arrangement of the light sources 40, the boards 30 and the grooves 24 can be suitably selected according to the usage and object of the device.

Figure 4A:
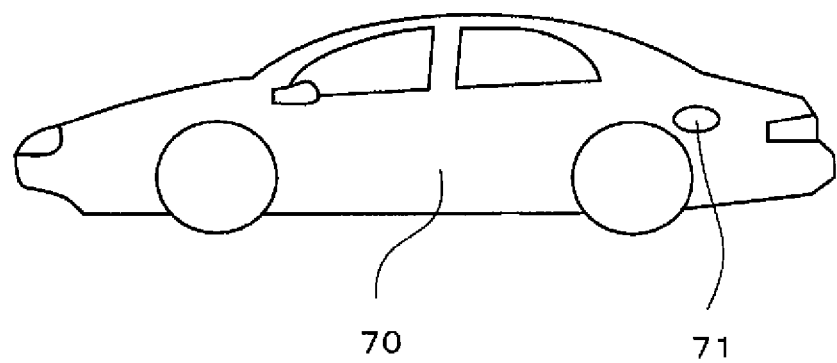
FIGS. 4A and 4B are diagrams showing an example of an application of the charging state displaying device shown in FIG. 1.
Figure 4B:
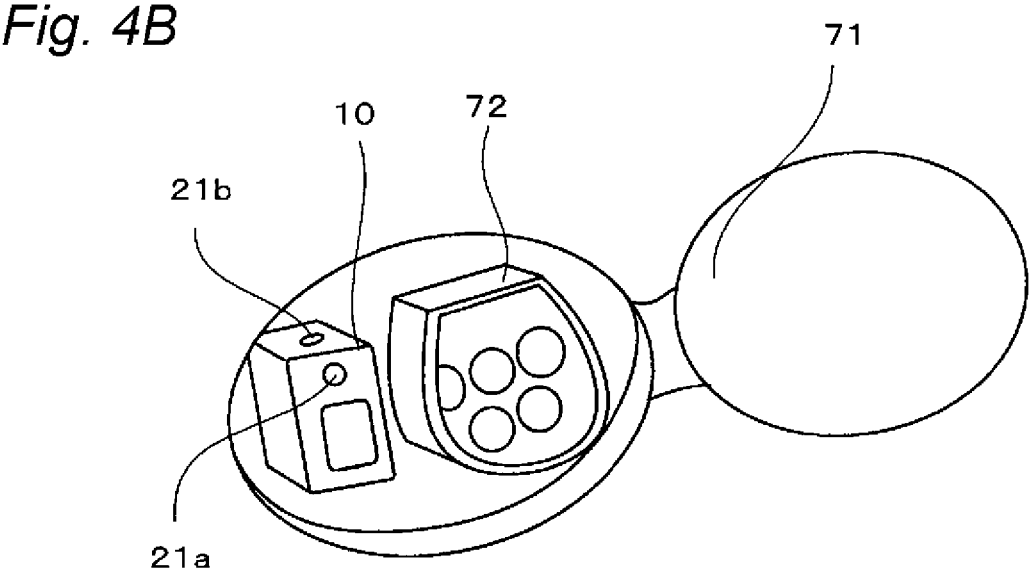
Figure 5A:
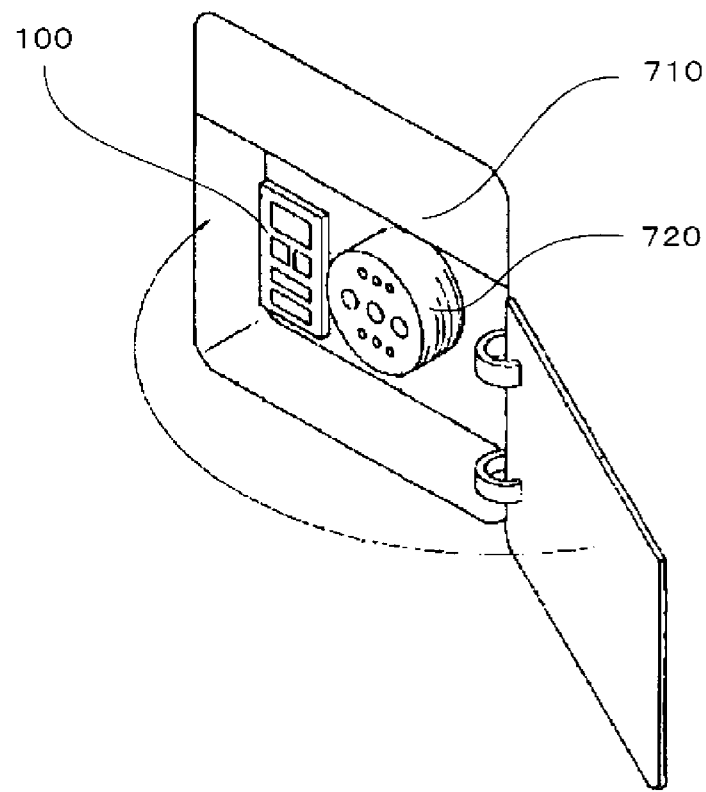
FIGS. 5A and 5B are diagrams showing the charging state displaying devices of a related art.
Figure 5B:
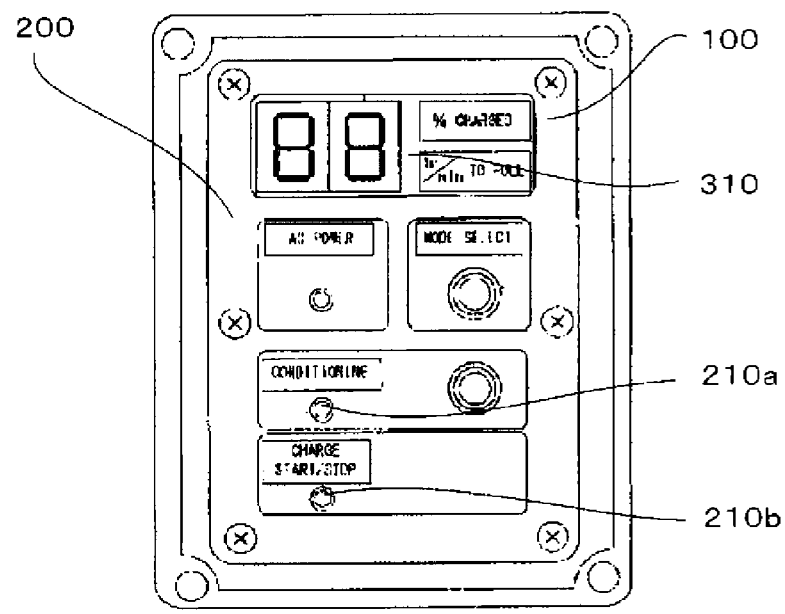
Figure 6A:
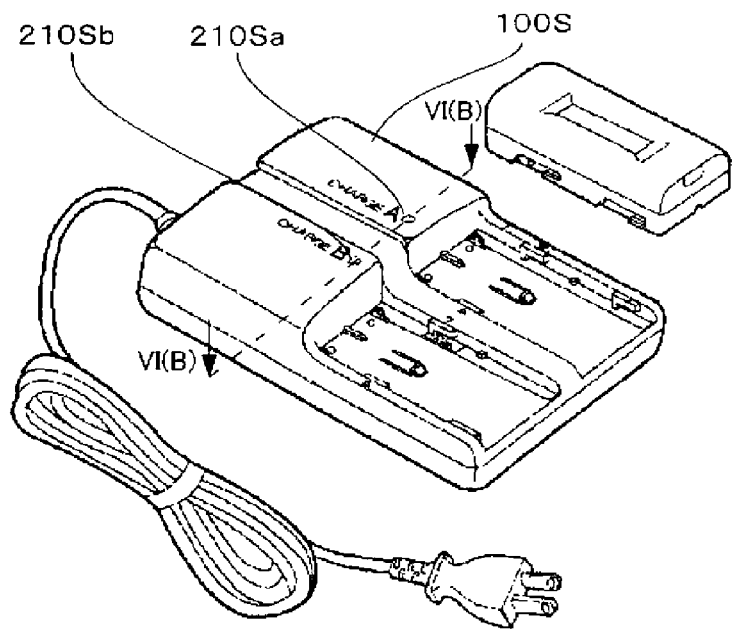
FIGS. 6A and 6B are diagrams showing the charging state displaying devices of another related art.
Figure 6B:
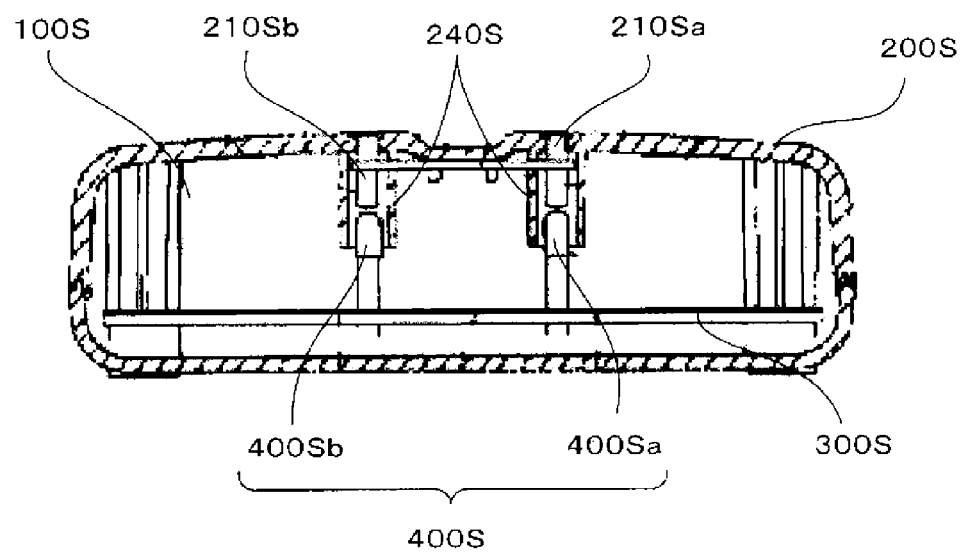

Next, the explanation will be made as to an example of the application of the charging state displaying device 10 according to the invention with reference to FIGS. 4A and 4B. FIG. 4A is a side view showing the external appearance of an electric car and FIG. 4B is a perspective view showing a power feeding part mounted on the electric car shown in FIG. 4A.

The explanation will be made as to an example where the charging state displaying device 10 according to the invention is applied to a power feeding part 71 mounted on an electric car 70. The power feeding part 71 is provided near the rear wheel of the electric car 70. In the power feeding part 71, a battery charging connector 72 for the electric car 70 and the charging state displaying device 10 according to the invention are disposed. When the charging operation for the battery is started, for example, a display showing the charging state can be recognized via the first lens 21a and the charging state etc. of the battery can be displayed via the second lens 21b. The display may be designed so as to be able to clearly recognize the position of the charging connector 72 as the feeding port, particularly in the night, for example.

As described above, the charging state displaying device 10 according to the invention includes the casing 20, the at least one board 30 and a plurality of the light sources 40. The light sources 40 are disposed so as to be separated by the board 30. The board 30 is mounted on the light blocking part 24 provided within the casing 20 and is accommodated within the casing 20. The casing 20 is provided with the display units 21 having light-permeability at the positions corresponding to the light sources 40, respectively. The board 30 is configured to prevent the leakage and mixture of the lights emitted from the light sources 40 in cooperation with the light blocking part 24.

According to the aforesaid configuration, the light emitted from the light source 40 can be surely transmitted through the display unit 21 and recognized visually. Further, according to the simple existing configuration of the board 30 and the light blocking part 24, even when the light source 40 (second light source 40b, for example) not corresponding to the one display unit 21 (first display unit 21a, for example) is turned on, since the light emitted from this light source 40 (second light source 40b) does not leak, the false recognition can be prevented. Furthermore, even when the light sources 40 having different luminescent colors are disposed, the mixture of the luminescent colors of the lights emitted therefrom can be prevented.

Further, according to the charging state displaying device 10 according to the invention, the first light source 40a and the second light source 40b are disposed on the both opposite surfaces of the board 30, respectively.

According to this configuration, since the light sources 40a, 40b are arranged by using the board 30, the utility value of the board 30 can be enhanced such that the light shielding property can be improved and the light sources 40 can be disposed on the both sides of the board 30, respectively.

Further, according to the charging state displaying device 10 according to the invention, the light blocking part 24 is the groove 24 provided on the inner surface of the casing 20 and the display unit 21 is the lens 21 provided on the side surface of the casing 20.

According to this configuration, since the board 30 can be surely accommodated and fixed within the casing 20 via the groove 24 and the light from the light source 40 can be collected by the lens 21, the visibility of the charging state displaying device 10 from the outside can be improved.

The invention is not limited to the aforesaid embodiments and may be suitably changed and modified, for example. The materials, shapes, sizes, numerical values, configurations, numbers, disposing positions etc. of the respective constituent elements of the aforesaid embodiments are not limited to the aforesaid ones and may be arbitral so long as the object of the invention can be attained.

Although the aforesaid explanation is made in detail concretely as to the case where the light blocking part 24 is the groove 24, the light blocking part is not limited thereto so long as it is configured so as to be able to shield the lights from the respective light sources 40. Thus, the light blocking part may be a flat plate which protrudes in the inner direction of the casing 20 to place the board 30 thereon or projections which protrude in the inner direction of the casing to engage with the board.

Although the aforesaid explanation is made in detail concretely as to the case where the display unit 21 for visually recognizing the light from the light source 40 is the lens 21 which converges the light from the light source 40 to improve the visibility, the display unit may be a member of a wave or flat-plate shape having light-permeability according to the object etc. of the display.

The luminance and luminescent color of each of the light sources 40 can be set freely. That is, various combinations of the luminescent colors can be set such that the luminescent color of the first light source 40*a* is red and the luminescent color of the second light source 40*b* is green, for example. Further, as a method of notifying the lighting state of the light source 40, a method such as the flashing, full-time lighting, changing the colors may be employed.

The aforesaid explanation is made by using the drawings as to the case that the light source 40 is the flat-shaped LED. However, since the LEDs on the market have various shapes, the LED of the arbitrary shape may be selected freely according to the usage of the light source. Further, the light source is not limited to the LED, and an EL (electro-luminescence) element etc. may be employed as the light source so long as it is a small-sized light source.

Although in the aforesaid explanation, the first and second are used as the numbers of the light sources 40, that is, the first light source 40*a* and the second light source 40*b*, the numbers of these light sources are not limited thereto. Also the numbers are employed as to the other constituent elements, the object and the technical effects of the invention do not change even if the first and second are used in a reverse manner.

The above-mentioned embodiment is merely a typical example of the present invention, and the present invention is not limited to the embodiment. That is, the present invention can be variously modified and implemented without departing from the essential features of the present invention.

The present invention is useful for providing a charging state displaying device which can prevent false recognition due to the leakage of lights from light sources by utilizing a board mounting the light sources thereon and a casing to which the board is attached.

What is claimed is:

1. A charging state displaying device comprising:
   a casing including a light blocking part;
   a circuit board mounted on the light blocking part and accommodated in the casing;
   a plurality of light sources disposed on the circuit board so as to be separated by the circuit board; and
   display units, having light-permeability, and provided at positions of the casing corresponding to the light sources respectively,
   wherein the light sources are respectively disposed on both opposite faces of the circuit board, and
   wherein the circuit board is configured to prevent leakage and mixture of lights emitted from the light sources in cooperation with the light blocking part.

2. The charging state displaying device according to claim 1,
   wherein the light blocking part is a groove provided on an inner surface of the casing.

3. The charging state displaying device according to claim 1,
   wherein two of the display units are lenses which are respectively provided at different surfaces of the casing.

\* \* \* \* \*